(12) United States Patent
Bauknecht et al.

(10) Patent No.: US 11,809,697 B2
(45) Date of Patent: Nov. 7, 2023

(54) PROCEDURE FOR CONFIGURING A MODULAR SAFETY SWITCHING DEVICE

(71) Applicant: Pilz GmbH & Co. KG, Ostfildern (DE)

(72) Inventors: Jochen Bauknecht, Ostfildern (DE); Florian Rotzinger, Ostfildern (DE)

(73) Assignee: Pilz GmbH & Co. KG, Ostfildern (DE)

( * ) Notice: Subject to any disclaimer, the term of this patent is extended or adjusted under 35 U.S.C. 154(b) by 90 days.

(21) Appl. No.: 17/405,771

(22) Filed: Aug. 18, 2021

(65) Prior Publication Data

US 2022/0066628 A1 Mar. 3, 2022

(30) Foreign Application Priority Data

Sep. 1, 2020 (DE) .......................... 102020122870.8

(51) Int. Cl.
*G06F 3/04847* (2022.01)
*G05B 19/042* (2006.01)
*G06F 3/0482* (2013.01)

(52) U.S. Cl.
CPC ..... *G06F 3/04847* (2013.01); *G05B 19/0428* (2013.01); *G06F 3/0482* (2013.01); *G05B 2219/24024* (2013.01)

(58) Field of Classification Search
CPC .... G06F 3/04847; G06F 3/0482; G06F 21/71; G06F 9/44505; G06F 21/73; G05B 19/0428; G05B 2219/24024

(Continued)

(56) References Cited

U.S. PATENT DOCUMENTS

| 2019/0025790 | A1* | 1/2019 | Sherriff | ................ | G05B 19/052 |
| 2020/0004555 | A1* | 1/2020 | Bossek | ................. | G06F 3/0486 |
| 2023/0045644 | A1* | 2/2023 | Poon | .................. | B01D 53/0415 |

FOREIGN PATENT DOCUMENTS

| CN | 103532740 | A | * | 1/2014 |
| CN | 107015825 | A | * | 8/2017 |

(Continued)

OTHER PUBLICATIONS

Office Action in corresponding German Patent Application No. 10 2020 122 870.8, dated Apr. 1, 2021, with English translation.

(Continued)

*Primary Examiner* — Thomas C Lee
*Assistant Examiner* — Michael Tang
(74) *Attorney, Agent, or Firm* — Edell, Shapiro & Finnan, LLC

(57) ABSTRACT

A method for configuring a modular safety switching apparatus having a plurality of electronic modules arranged in at least one module row, comprises: selecting, via a graphic user interface of a software-based configuration tool, a number of safety functions of the safety switching apparatus and logic requirements to be met by the safety switching apparatus; generating a configuration of the safety switching apparatus via the configuration tool by automated selection of the electronic modules from a plurality of types of electronic modules in order to implement the selected safety functions of the safety switching apparatus and logic requirements to be met by the safety switching apparatus; and storing the configuration of the safety switching apparatus as a configuration data set in a configuration database.

4 Claims, 1 Drawing Sheet

(58) Field of Classification Search
USPC .................................. 700/21, 86, 275; 361/1
See application file for complete search history.

(56) References Cited

FOREIGN PATENT DOCUMENTS

| EP | 2098924 A1 | 9/2009 | |
|---|---|---|---|
| EP | 2098926 A1 * | 9/2009 | ......... G05B 19/0426 |
| EP | 2098926 B1 | 5/2011 | |
| WO | WO-2018224625 A1 * | 12/2018 | ............. A47L 5/365 |

OTHER PUBLICATIONS

Search Report in corresponding European Patent Application No. 21189467, dated Feb. 11, 2022, with English translation.

* cited by examiner

PROCEDURE FOR CONFIGURING A MODULAR SAFETY SWITCHING DEVICE

CROSS REFERENCE TO RELATED APPLICATIONS

This application claims foreign priority under 35 U.S.C. § 119(a)-(d) to Application No. DE 102020122870.8 filed on Sep. 1, 2020, the entire contents of which are hereby incorporated by reference.

TECHNICAL FIELD

The present disclosure relates to a method for configuring a modular safety switching apparatus.

BACKGROUND

Modular safety switching apparatuses are well-known in many different embodiments from the prior art. They serve, in particular, the purpose of safely transferring technical systems or machines into a harmless state for humans in the event of a hazardous situation. For this purpose, corresponding signals of signal transmitters, which may be, for example, emergency OFF switches, emergency STOP switches, light grids, light barriers, pressure sensitive safety shutdown mats, safety door position switches, 3D laser scanners, etc., are received and reliably evaluated on the input side. On the output side one or more reliable output contacts of an output circuit are activated. In the event of a hazardous situation, these output contacts are used to drive the actuators, such as, for example, contactors, valves, etc., such that a machine or technical system, which is connected to the actuators, can be transferred into a harmless state for humans.

Such safety switching apparatuses comprise several electronic modules that are arranged in at least one row of modules and have certain functionalities. The modular design of a safety switching apparatus offers the possibility of an application-specific configuration, in which several electronic modules are individually assembled, electrically connected to one another and configured such that they work together to provide the modular safety switching apparatus with the desired safety functions. Examples of electronic modules, from which modular safety switching apparatuses with very different safety functions can be assembled, are, among others, input modules, which can receive and, if necessary, process input signals of one or more signal transmitters, such as, for example, input signals of sensors or emergency command devices; output modules, which can emit output signals to one or more actuators connected to the output modules; combined input and output modules (so-called I/O modules); control modules, which can control the matching of input modules to output modules; as well as interface modules; communication modules; fieldbus controllers; fieldbus couplers; etc.

During the production process of a modular safety switching apparatus, the electronic modules are lined up beside each other in the at least one row of modules and electrically connected accordingly and configured such that they can provide the functionalities required for the specific use for which they were intended in terms of the safety aspects. Depending on the specific use for which they were intended, the configuration of such modular safety switching apparatuses is often relatively complex, since in order to implement the desired safety functions, it is necessary, for example, to consider and implement AND logic operations.

SUMMARY

An object of the disclosed method is to simply the configuration process of a modular safety switching apparatus and also the assembly process at a later date.

An inventive method for configuring a modular safety switching apparatus that has a plurality of electronic modules, wherein the electronic modules are selected from a large number of available types of electronic modules, comprises the steps of selecting a number of safety functions of the safety switching apparatus and logic requirements, to be met by the safety switching apparatus, via a graphic user interface of a software-based configuration tool, generating a configuration of the safety switching apparatus via the configuration tool by automated selection of electronic modules from the large number of types of electronic modules, in order to implement the functions of the safety switching apparatus and logic requirements, to be met by the safety switching apparatus, that were selected in the preceding step, as well as storing the configuration as a configuration data set in a configuration database.

The disclosed method can be used to greatly simplify the sometimes very complex configuration of a modular safety switching apparatus by supporting the method via the software-based configuration tool. The graphic user interface, which is made available to the user preferably over the internet, makes it possible to operate the configuration tool easily and intuitively. The user can make interactive user inputs and, for example, specify the corresponding logic requirements, to be met by the modular safety switching apparatus. During the configuration process it is possible for the user to select, for example, also certain signal transmitters, in particular, signaling devices, which are present in the system and/or machine to be controlled, such as, for example, emergency OFF buttons or emergency STOP buttons, safety doors, light grids, etc.; or sensors, the input signals of which have to be reliably evaluated; as well as actuators, which have to be reliably activated by the output modules. Consequently the inputs and outputs of the modular safety switching apparatus can be configured with the aid of the configuration tool. The basic idea of the method, presented here, is that the configuration tool generates, as a function of the user inputs, the configuration of the modular safety switching apparatus in an automated process without the user having to have any special expert knowledge for this purpose. The user's requirements, to be met by the modular safety switching apparatus, are processed by the configuration tool. The configuration tool assembles a modular safety switching apparatus, which meets the specific user requirements, from the available types of electronic modules and, in so doing, implements the desired safety functions. The configuration tool outputs a corresponding module combination as a configuration data set, which is stored for retrieval in the configuration database. During the assembly process of the modular safety switching apparatus, this configuration data set can be retrieved from the configuration database and can be processed accordingly.

In a preferred embodiment, it is proposed that the configuration tool generate a wiring diagram for the electronic modules. The wiring diagram is stored for retrieval in the configuration database and is linked to the configuration data set or forms part of the configuration data set. This wiring diagram indicates, in particular, how the individual electronic modules of the safety switching apparatus have to be wired together either directly at the manufacturer or during a subsequent final assembly at the point of use, so that the modular safety switching apparatus can implement the desired safety functions and logic requirements.

In a particularly preferred embodiment, there exists the possibility that the configuration tool calculates the safety relevant characteristics of the modular safety switching apparatus. The characteristics are stored for retrieval in the configuration database and are linked to the configuration data set or form part of the configuration data set.

In one advantageous embodiment it is proposed that the configuration tool generate an alphanumeric identifier, which forms at least part of the configuration data set, for each of the electronic modules of the modular safety switching apparatus. In this case the alphanumeric identifier is selected such that it clearly specifies the relevant electronic module and its mounting position in the at least one row of modules of the modular safety switching apparatus. The term "alphanumeric identifier" is to be understood as meaning in the context of this patent application an identifier that is composed of letters and/or numbers. Each individual electronic module can receive, for example, an alphanumeric identifier that has two alphanumeric characters and that clearly specifies the electronic module and its mounting position. In this way, the formation of the at least one row of modules of the modular safety switching apparatus from the individual electronic modules can be significantly simplified. The unique sequence, in which the electronic modules are to be mounted during production, can be determined, for example, from a sequence of the alphanumeric characters, with which the electronic modules are characterized in the configuration data set, which is stored for retrieval in the configuration database. The configuration tool generates an alphanumeric identifier of the entire safety switching apparatus; in particular, the number of electronic modules of the modular safety switching apparatus is also reflected in the character length of the alphanumeric identifier.

In a particularly advantageous embodiment, it is proposed that the configuration tool generate for at least some of the electronic modules of the modular safety switching apparatus an additional alphanumeric identifier, which forms at least part of the configuration data set. In this case the additional alphanumeric identifier is selected such that it clearly specifies the position of at least one rotary switch, in particular, a detent potentiometer of the relevant electronic module. For example, two or more additional alphanumeric characters can be provided that form the additional alphanumeric identifier and clearly define the positions of the rotary switches, in particular, the detent potentiometers of the relevant electronic module that are to be used for the desired configuration of the modular safety switching apparatus.

In a preferred embodiment, there exists the possibility that a check digit, in particular, a check sum, is generated for the alphanumeric identifier of each of the electronic modules. This aspect allows for, in particular, a consistency check that prevents a modular safety switching apparatus from being produced with a faulty configuration.

BRIEF DESCRIPTION OF THE DRAWINGS

Other features and advantages of the disclosed method will become apparent from the following description of a preferred example embodiment with reference to the accompanying drawings that show in.

DETAILED DESCRIPTION

Figure 1:
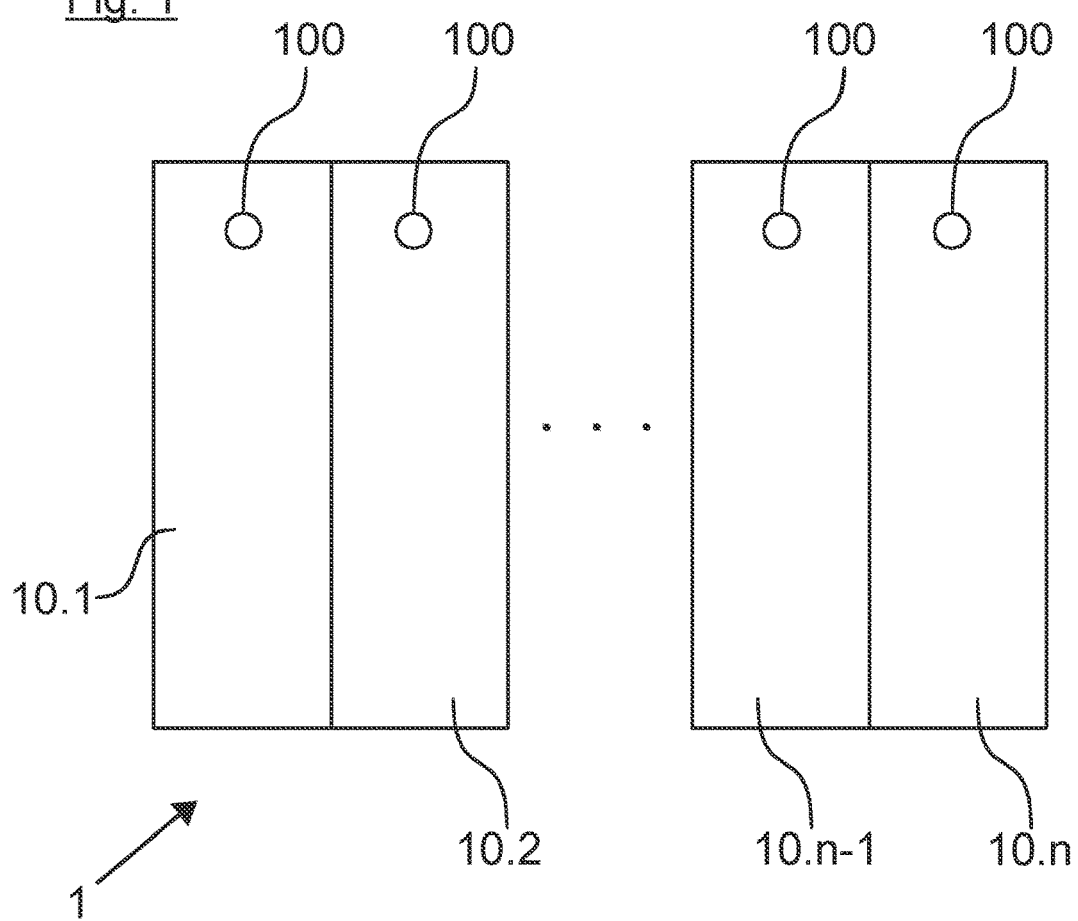
FIG. 1 a schematic representation of a modular safety switching apparatus that is assembled from a plurality of electronic modules.
Figure 2:
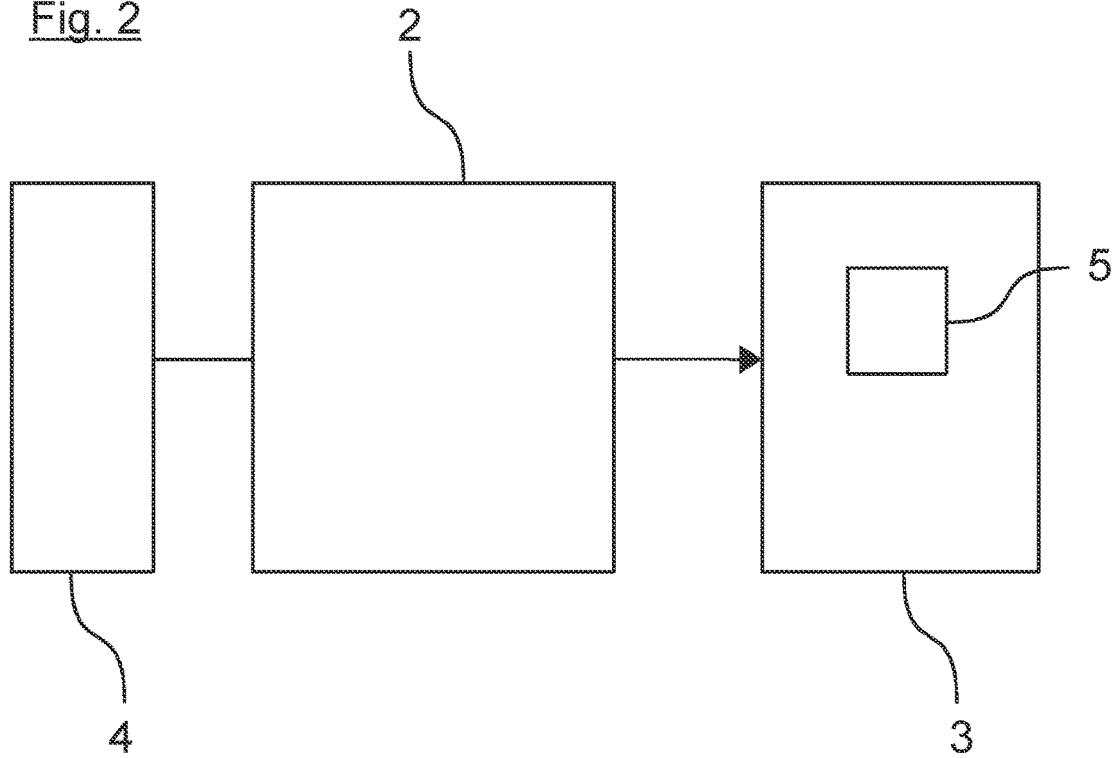
FIG. 2 a schematic representation, which illustrates the key features of a method for configuring a modular safety switching apparatus in accordance with the disclosure.

With reference to FIG. 1, the basic design of a modular safety switching apparatus 1 will be explained below in greater detail. The modular safety switching apparatus 1 comprises a plurality n of electronic modules $10.1$-$10.n$, which are arranged in at least one row of modules. In this case, a first electronic module 10.1 forms preferably a central control module of the modular safety switching apparatus 1 and is also often referred to as a head module. The rest of the electronic modules $10.2$-$10.n$ are selected from a large number of different types of electronic modules according to the application-specific requirements. The rest of the electronic modules $10.2$-$10.n$ may be, for example, input modules, which can reliably receive and, if necessary, process input signals of one or more signal transmitters, such as, for example, input signals of sensors or emergency command devices; output modules, which can reliably emit output signals to one or more actuators connected to the output modules; combined input and output modules (so-called I/O modules), which have inputs and outputs; as well as interface modules; fieldbus controllers; fieldbus couplers, etc. The number and type of the electronic modules $10.1$-$10.n$ that are used depends directly on the intended use and application of the modular safety switching apparatus 1 and, in particular, also on the safety level to be reached. In general, the task of the modular safety switching apparatus 1 is to shut off in a safety-oriented manner the actuators, connected to the modular safety switching apparatus 1, in the event of a hazardous situation, which is detected by the sensors and/or signaling devices, and to re-activate after the end of the hazardous situation.

Depending on the intended use of the modular safety switching apparatus 1, the configuration of the modular design may be very time consuming and difficult. A method, by which the configuration process and also the subsequent assembly process of the modular safety switching apparatus 1 can be greatly simplified, will be described below.

Such a method for configuring a modular safety switching apparatus 1, which has a plurality of electronic modules $10.1$-$10.n$, which are arranged in at least one row of modules, comprises the steps explained as follows.

In a first step, a number of safety functions of the safety switching apparatus 1 and logic requirements, to be met by the safety switching apparatus 1, are selected by a user via a graphic user interface 4 of a software-based configuration tool 2. This software-based configuration tool 2 is executed by a computing apparatus. The graphic user interface 4 is displayed to a user via a display apparatus. This display apparatus does not necessarily have to be a display apparatus, which is connected to the computing apparatus, which executes the software-based configuration tool 2. For example, the graphic user interface 4 may be represented using a display apparatus of an additional computing apparatus, which may be, for example, a computer, a tablet PC or a mobile telephone, which is connected over the internet to the computing apparatus, which executes the software-based configuration tool 2.

In a next step, a configuration of the safety switching apparatus 1 is generated by the configuration tool 2 by automated selection of electronic modules 10.1-10.n from a large number of available types of electronic modules. This configuration can be used to implement the safety functions of the safety switching apparatus 1 and logic requirements, to be met by the safety switching apparatus 1, that were selected in the preceding step.

Then this configuration of the safety switching apparatus 1 is stored for retrieval as a configuration data set 5 in a configuration database 3 preferably at the manufacturer of the modular safety switching apparatus 1.

In this configuration process the user can specify, for example, a number of protected zones in a technical system, wherein certain safety requirements must be met in these protected zones. The configuration tool 2 is designed preferably such that it selects on its own in an automated process the signal transmitters, in particular, signaling devices and/or sensors, and actuators, which lend themselves to the specified safety requirements, as well as the electronic modules 10.1-10.n, required to operate the signal transmitters and actuators. The signal transmitters and actuators can also be specified by a user during the configuration process. Furthermore, the configuration tool 2 can also be used preferably to calculate a variety of safety characteristics of the modular safety switching apparatus 1, such as, for example, the spacing, to be maintained in protected zones, or the like. Preferably these characteristics are also stored for retrieval in the configuration database 3 and are linked to the configuration data set 5.

In addition, the configuration tool 2 can also generate preferably a wiring diagram for the electronic modules 10.1-10.n. The wiring diagram is stored for retrieval in the configuration database 3 and is linked to the configuration data set 5 or forms part of the configuration data set 5. This wiring diagram indicates, in particular, how the individual electronic modules 10.1-10.n of the safety switching apparatus 1 have to be wired together either directly at the manufacturer or during a subsequent assembly at the point of use, so that the modular safety switching apparatus 1 can implement the desired safety functions and logic requirements.

Preferably, the configuration tool 2 generates an alphanumeric identifier for each of the electronic modules 10.1-10.n of the modular safety switching apparatus 1. In this case, the alphanumeric identifier is selected such that it clearly specifies the electronic module 10.1-10.n and its mounting position in the row of modules of the modular safety switching apparatus 1.

Each individual electronic module 10.1-10.n can receive, for example, a four digit alphanumeric identifier, consisting of two alphanumeric characters, which clearly specify the electronic module 10.1-10n and its mounting position (position identifier). For example, two or more additional alphanumeric characters can be provided that form an additional identifier (setting identifier) and that clearly define the positions of one or more rotary switches 100, in particular, one or more detent potentiometers, of the relevant electronic module 10.1-10.n, that need to be set for the correct configuration during the assembly process. The unique sequence, in which the electronic modules 10.1-10.n are to be mounted at a later date, can be determined, for example, from a sequence of alphanumeric characters, with which the electronic modules 10.1-10.n are characterized in the configuration data set 5, which is stored for retrieval in the configuration database 3.

Therefore, the configuration tool 2 generates an alphanumeric identifier of the entire modular safety switching apparatus 1 that is stored for retrieval in the configuration database 3 at least as part of the configuration data set 5; and the character length of the alphanumeric identifier also reflects, in particular, the number of electronic modules 10.1-10.n.

In one advantageous further development there exists the possibility that a check digit, in particular, a check sum, is generated for the alphanumeric identifier of each of the electronic modules 10.1-10.n. This aspect allows for, in particular, a consistency check that prevents a customer from receiving a modular safety switching apparatus 1 that is not in the desired configuration.

The configuration data set 5, which is stored for retrieval in the configuration database 3, can be read, for example, after initiating a work order at the manufacturer of the modular safety switching apparatus 1. The system configuration of the modular safety switching apparatus 1 is carried out preferably at special workbenches at the manufacturer. These workbenches receive the configuration data set 5 of the modular safety switching apparatus 1 from the configuration database 3. A software program prepares from the configuration data set 5 a visual representation of the modular safety switching apparatus 1 for the workers; and the visual representation is displayed on a display apparatus. With the help of this visual representation and the wiring diagram the configuration of the modular safety switching apparatus 1 from the electronic modules 10.1-10.n can be carried out now very easily.

What is claimed is:

1. A method for configuring a modular safety switching apparatus having a plurality of electronic modules selected from a plurality of available electronic module types and arranged in at least one module row, the method comprising:
   receiving, via a graphic user interface of a software-based configuration tool, a selection of safety functions of the safety switching apparatus and logic requirements to be met by the safety switching apparatus;
   generating a configuration of the safety switching apparatus via the configuration tool by automated selection of the electronic modules from the plurality of available electronic module types in order to implement the selected safety functions of the safety switching apparatus and logic requirements to be met by the safety switching apparatus, wherein:
      the configuration tool generates for each of the electronic modules of the modular safety switching apparatus an alphanumeric identifier that forms at least part of a configuration data set, wherein the alphanumeric identifier specifies the relevant electronic module and its mounting position in the module row of the modular safety switching apparatus; and
      for at least some of the electronic modules of the modular safety switching apparatus, the configuration tool generates an additional alphanumeric identifier that forms at least part of the configuration data set, wherein the additional alphanumeric identifier specifies a position of at least one detent potentiometer of one of the electronic modules;
   storing the configuration of the safety switching apparatus as the configuration data set in a configuration database; and
   assembling the safety switch apparatus according to the stored configuration.

2. The method of claim 1, wherein the configuration tool generates a wiring diagram for the electronic modules of the modular safety switching apparatus, the wiring diagram being stored for retrieval in the configuration database and being linked to the configuration data set or forms part of the configuration data set.

3. The method of claim 1, wherein the configuration tool calculates safety relevant characteristics of the modular safety switching apparatus, the characteristics being stored for retrieval in the configuration database and linked to the configuration data set or form part of the configuration data set.

4. The method of claim 1, wherein a check sum is generated for the alphanumeric identifier of each of the electronic modules.

\* \* \* \* \*